March 10, 1959 — D. A. ROTH — 2,876,901
CONVEYOR
Filed March 30, 1956 — 2 Sheets-Sheet 1

INVENTOR.
DWIGHT A. ROTH
BY M. A. Hobbs
ATTORNEY

March 10, 1959 D. A. ROTH 2,876,901
CONVEYOR
Filed March 30, 1956 2 Sheets-Sheet 2
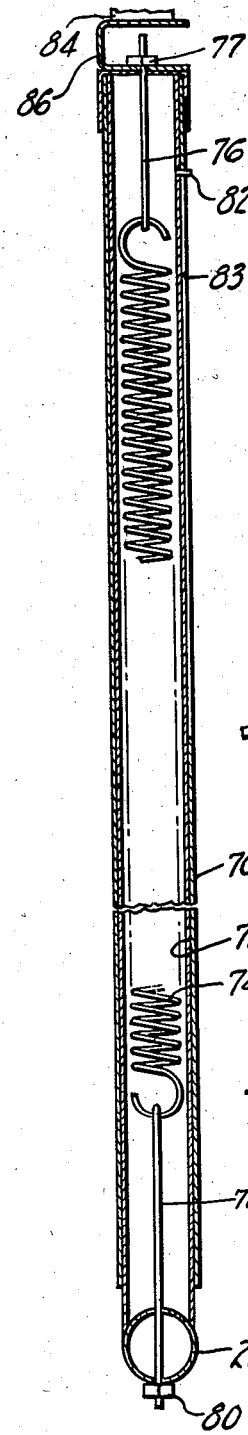
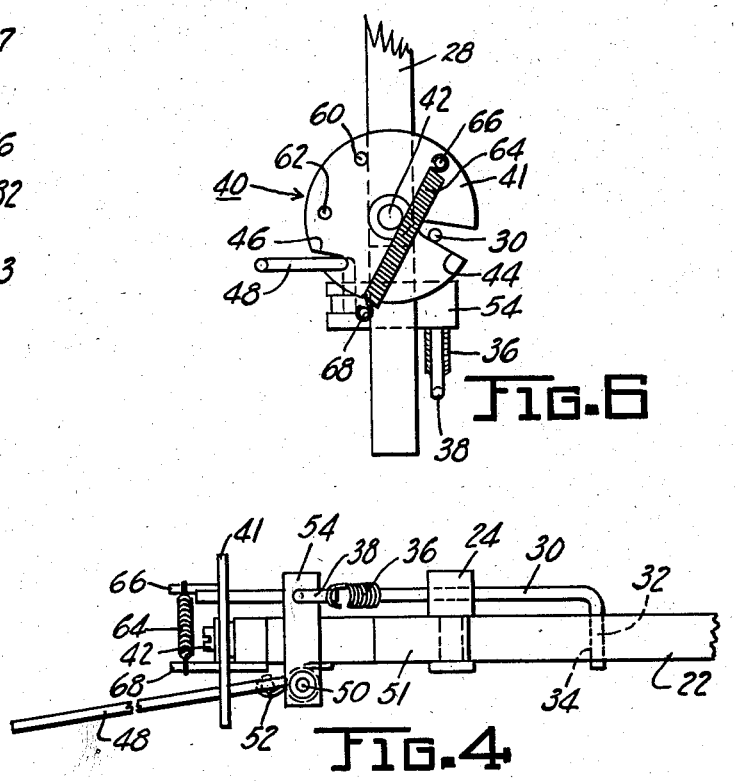
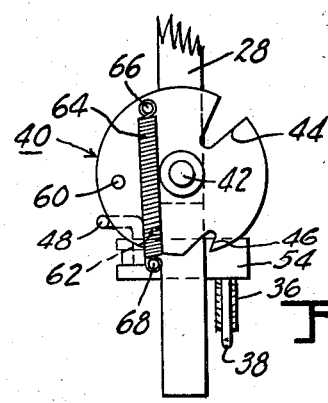
INVENTOR.
DWIGHT A. ROTH
BY
M. A. Hobbs
ATTORNEY United States Patent Office 2,876,901
Patented Mar. 10, 1959

2,876,901

CONVEYOR

Dwight A. Roth, Goshen, Ind.

Application March 30, 1956, Serial No. 575,275

5 Claims. (Cl. 209—121)

The present invention relates to a conveyor or the like and more particularly to a conveyor or weighing and sorting mechanism.

In the poultry industry dressed chickens are packed, shipped and sold according to their weight, i. e. dressed birds weighing two pounds are packed and shipped together, and birds weighing three pounds are likewise packed and shipped together, etc. In large operations the usual practice has been to dress the birds at one station along a production line and convey them to another station where they are individually weighed, sorted according to their weight, and packed for shipment. The present invention therefore has as one of its principal objects to combine the conveying, weighing and sorting operations into a single automatic operation.

Another object of the present invention is to provide a mechanism for weighing poultry as it is conveyed from one station to another in a dressing operation, and sorting the poultry into lots according to weight.

Still another object of the invention is to provide a mechanism for weighing and sorting poultry, which can readily be installed and operated on conventional conveyor equipment.

A further object of the invention is to provide a relatively simple, easily cleaned and serviced device for weighing and sorting poultry as it is transported on a conveyor from one station to another in a poultry dressing operation.

Further objects and advantages of the present invention will become apparent from the following description and the accompanying drawings, wherein:

Figure 4 is a bottom view of the mechanism shown in Figure 3;

Figure 6 is a rear view of the mechanism of Figures 3, 4 and 5, showing the latch mechanism in its latched position;

Figure 7 is a rear view similar to that of Figure 6 but showing the latch mechanism in its unlatched position; and Figure 8 is a vertical cross-sectional view of the weighing mechanism, taken on line 8—8 of Figure 1.

Figure 1:
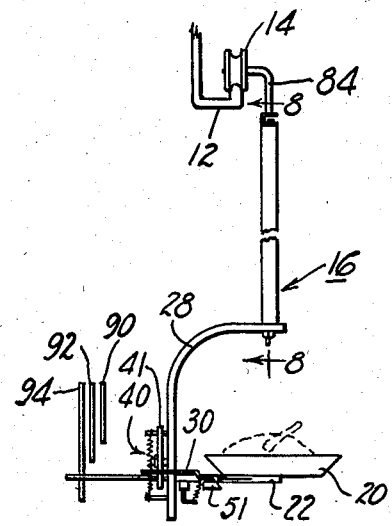
Figure 1 is a side elevational view of my poultry conveyor, weighing and sorting mechanism, showing a dressed bird being handled thereby.
Figure 2:
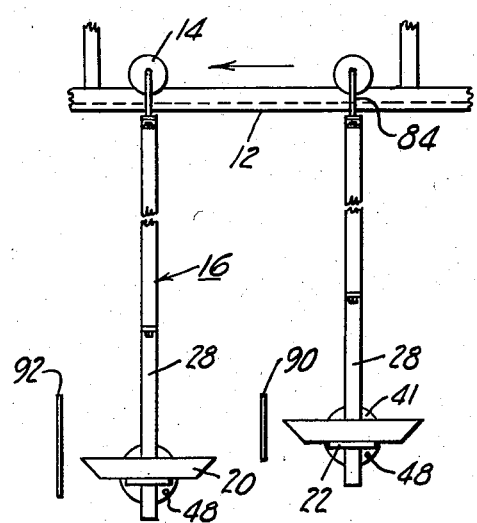
Figure 2 is a front elevational view of the poultry conveyor, weighing and sorting mechanism, showing two units carrying birds of different weights.

Referring more specifically to the drawings and to Figures 1 and 2 in particular, numeral 12 designates a conventional conveyor track, and 14 a roller mounted on the track for supporting my weighing and sorting unit 16. One or more rollers 14 are employed for each unit 16 and are moved along track 12 by a chain, cable or the like by a suitable power drive mechanism, not shown. The conveyor is an endless track type suspended from an overhead supporting structure and is laid out to pass along the various stations in the poultry dressing operation. A relatively large number of units 16 are normally mounted on the conveyor and spaced a short distance apart around the entire endless track. Figure 2 shows two units 16 having thereon dressed birds of different weights.

Figure 3:
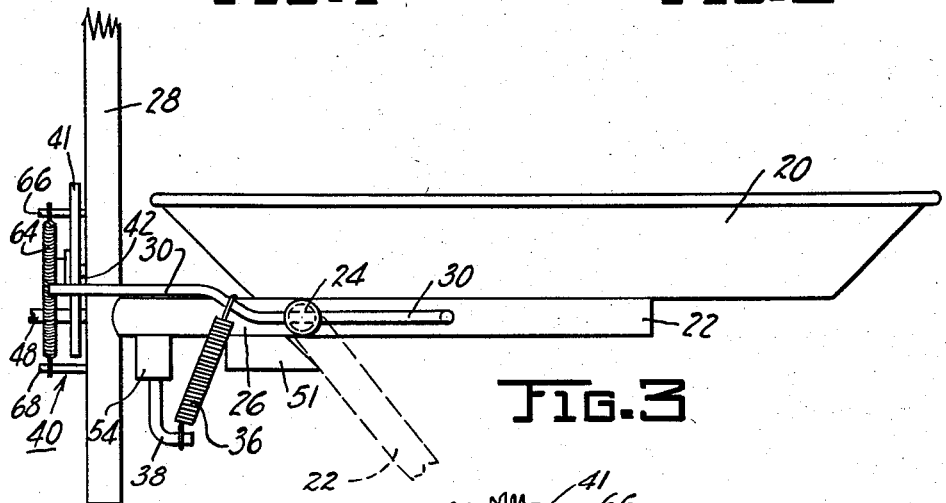
Figure 3 is an enlarged side elevational view of the poultry receiving tray and latch mechanism for sorting the poultry according to weight.
Figure 5:
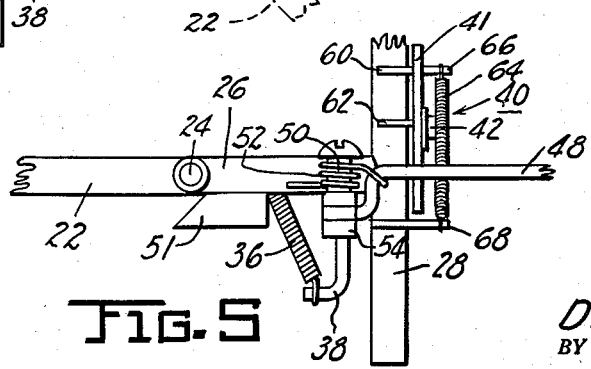
Figure 5 is a fragmentary elevational view of the mechanism shown in Figures 3 and 4 from the side opposite to that shown in Figure 3.

The dressed bird is carried by unit 16 on a tray 20 supported by an arm 22 which is rigidly secured to the bottom of the tray and pivoted on a pin 24 at the end of a supporting arm 26 secured to the lower end of a curved bracket 28. Arm 22 is held in its horizontal position as shown in full lines in Figure 3 by a rod 30 pivoted on pin 24 and secured to arm 22 by the end 32 thereof extending through a hole 34 near the center of the arm. Rod 30 and consequently arm 22 are urged into their horizontal positions by a spring 36 anchored at one end to a fixed pin 38 attached to the lower side of arm 26 and anchored at the other end to rod 30 to the left of pin 24. Spring 36 has sufficient strength to hold rod 30 and arm 22 in their horizontal position and thus to hold tray 20 in its level position and to return these elements to those positions; however, this spring does not have sufficient strength alone to hold those elements in that position when a bird has been placed in the tray. A latch mechanism 40 operating through rod 30 is provided to hold the tray in its level position until the latch is tripped, as will be more fully explained hereinafter.

The latch mechanism 40 consists of a rotatable disc 41 mounted on a pin 42 secured to bracket 28 and includes two radial slots 44 and 46, the first of said slots being adapted to receive the free end of rod 30 and to retain said rod in its horizontal position when the disc is in the position shown in Figure 6, the second of said slots being adapted to receive a rod 48 which is pivoted on a fixed pin 50 for horizontal movement only. When rod 48 has been moved horizontally until it clears disc 41, said disc is free to rotate in a counter clockwise direction until slot 44 is in approximately the one-o'clock position as shown in Figure 7. With slot 44 in this position rod 30 is free to move from said slot thus permitting arm 22 and tray 20 to fall under the weight of a dressed bird to the position indicated by broken lines in Figure 3. A lug 51 attached to arm 26 limits the downward movement of arm 22 and tray 20 to that shown by the broken lines. When the tray tips to the lower position, the bird slides from the tray and spring 36 returns arm 22 and tray 20 to their original level position. The free end of rod 30 moves downwardly as the rod and tray return to their original position under the force of spring 36 and slips into slot 44 rotating the disc in the clockwise direction to the original position shown in Figure 6. Rod 48 which is urged in the right hand direction, as seen in Figure 6, by a spring 52 on pin 50 and which has been riding on the periphery of the disc as the latter rotated to and from the position shown in Figure 7, slips into slot 46 and prevents the disc from rotating. While the disc is held from rotating, rod 22 is locked in its horizontal position in slot 44. Pin 50 is seated in a bracket 54 rigidly secured to arm 26 and is of sufficient strength to prevent any substantial vertical movement by rod 48. Thus the rod 48 is restricted to horizontal movement to and from slot 46.

The distance which disc 41 can rotate in the clockwise direction is determined by the position of a pin 60 projecting from the inside surface of the disc sufficiently far to strike bracket 28. This pin is so located on the disc that when it strikes bracket 28, slot 44 is in the proper position to hold arm 22 in its horizontal position, and slot 46 is in the proper position to receive arm 48. The distance which disc 41 can rotate in the counterclockwise direction is determined by the position of a pin 62 also projecting from the inside surface of the disc sufficiently to strike the lower part of bracket 28. The pin is positioned on the disc to stop the rotation of the disc when slot 44 is in the one o'clock position as shown in Figure 7. In order to retain the disc in the position at which rod 30 leaves slot 44 until said rod returns thereto, a spring 64 is attached at one end to pin 66 on disc 41 and anchored at the other end on a fixed pin 68 secured to the lower end of bracket 28. Pin 68 is so located relative to pin 66 that the greatest expansion of the spring is passed before the counterclockwise movement of the disc is stopped by pin 62 striking bracket 28; hence some additional force is required to start the movement of the disc in the clockwise direction when rod 30 returns to the slot 44. Spring 36 is provided with sufficient strength over and above that required to return arm 22 and tray 20 to their level positions to overcome the force of spring 64 tending to hold the disc in its extreme counterclockwise position and to return the disc to the position shown in Figure 7, where the disc is locked by rod 48 from rotation in either direction.

The weighing device of my mechanism is shown in detail in Figure 8 and consists of telescoping outer sleeve 70 and inner sleeve 72, having disposed therein the main spring 74 of the scales. The spring is supported at the upper end by a rod 76 which extends through the end wall of sleeve 72 and is anchored by a nut 77 threaded onto said rod. The spring is connected at the lower end to bracket 28 by a rod 78 having a nut 80 threaded thereon below the bracket. Sleeve 72 is preferably welded or otherwise attached to bracket 28. Sleeve 72 is prevented from turning in sleeve 70 by a pin 82 seated in the side of sleeve 72 and extending through a longitudinal slot 83 in the side wall of sleeve 70. By preventing the sleeves from rotating relative to one another the tray is always maintained in the same position with respect to the conveyor track shown in Figures 1 and 2. Sleeve 70 is connected to conveyor roller 14 by a rod 84 and a U-shaped fixture 86 welded or otherwise joined to the lower end of rod 84 and connected to the upper end of sleeve 70 by rod and nut 76 and 77, respectively. The tension initially placed on spring 74 is adjusted by tightening or loosening nut 80 on rod 78. Different weight birds placed on tray 20 will place different degrees of tension on spring 74 and will pull sleeve 72 to a greater or lesser distance from sleeve 70, permitting bracket 28 and everything supported thereby to vary in height according to the weight placed on the tray.

Rod 48 of the latch mechanism is tripped as unit 16 moves along the conveyor by fingers 90, 92 and 94, which are rigidly fixed by any suitable means in the path of rod 48. These fingers are spaced along the conveyor line, as shown in Figure 2, at the packing stations for each separate weight of bird. As rod 48 strikes one of the fingers as the units 16 move along the conveyor in the direction of arrow shown on Figure 2, said rod is pulled outwardly from slot 46 until it is completely free thereof and can no longer restrict the rotation of the disc. The free end of rod 30 which had been held from moving in a vertical direction by the disc part above slot 44, can now rotate the disc and move upwardly, thus permitting arm 22 and tray 20 to fall to their lower position and dump the bird into a shipping container positioned there below. When the bird has fallen from the tray, spring 36 pulls the tray and arm 22 upwardly and the free end of rod 30 downwardly. As the free end of the rod moves downwardly, it slips into slot 44 and rotates disc 41 to its original starting point, as shown in Figure 6. In the meantime rod 48 has become disengaged from the tripping finger by the movement of unit 16 along the conveyor to the point where the free end of said rod can slide off the side of the finger and snap back against the periphery of the disc, if said disc has not returned to its original position, or directly into slot 46 if the disc has returned to its original position. In the former situation, rod 48 rides on the periphery of the disc until the disc is returned to its original position and then snaps into slot 46 where it holds the disc from further rotation until it is again pulled from slot 46. As long as rod 48 is in slot 46, rod 30, arm 22 and tray 20 are all held in their horizontal positions.

In the operation of my poultry conveyor, weighing and sorting mechanism, dressed birds of varying weights are placed on trays 20 as units 16 move along track 12 and are carried to the packing station. As shown in Figure 2, birds of, for example, two pounds and under do not lower rod 48 sufficiently to pass under finger 90; consequently rod 48 engages said finger and is pulled from slot 46, thus permitting disc 41 to rotate, the free end of rod 30 to move upwardly from slot 44, and tray 20 to move downwardly, dumping the bird. The tray is then returned to its level position by spring 36, as previously explained herein. Birds of two to three pounds in weight cause the scales to yield to the point where rod 48 will pass under finger 90 but will engage finger 92. Hence birds weighing in the range of two to three pounds will be dumped at a different point along the conveyor line than those weighing less than two pounds. By selecting fingers having less difference in length, a more selective sorting can be obtained; for example, the birds can be sorted into lots varying from one another by only a half a pound.

Various other types of latching and tripping mechanisms can be substituted for, and modifications can be made in the one described in detail herein without departing from the scope of the present invention. Also in place of spring 36, a fixed bracket or lever placed in the path of tray 20 and arm 22 can be employed to return positively said tray and lever to their level position as my mechanism moves along the track after the tray has dumped its bird.

I claim:

1. A weighing and sorting mechanism for use with a conveyor, comprising a means for receiving an article, a pivoted lever for supporting said means, a bracket for supporting said means, a means for mounting said bracket on a conveyor thereabove, a spring means adapted to be extended in proportion to the weight placed on said first means, a latch means on said bracket for holding said first means in receiving position, including a rotatable disc having two slots therein, a pivoted rod adapted to seat in one of said slots and hold said disc from rotating, a second pivoted rod attached to said lever and adapted to seat in the other of said slots and prevent said lever from pivoting while said first rod is in its respective slot and a plurality of members fixed relatively to the conveyor for engaging and holding said first rod as the mechanism moves along the conveyor until said rod is withdrawn from said slot, thereby permitting said disc to rotate and release the rod holding the lever from pivoting.

2. A poultry weighing and sorting mechanism for use with a conveyor, comprising a tray for poultry, a pivoted lever for supporting said tray, a bracket for supporting said lever, a means for mounting said bracket on a conveyor thereabove, a yieldable means adapted to be extended in proportion to the weight placed on said tray, a latch means on said bracket for holding said lever and tray in a level position, including a rotatable disc having two slots therein, a pivoted rod adapted to seat in one of said slots and hold said disc from rotating, a second pivoted rod attached to said lever and adapted to seat in the other of said slots and prevent said lever from pivoting, and a member fixed relatively to the conveyor for engaging and holding said first rod as the mechanism moves along the conveyor until said rod is withdrawn from said slot, thereby permitting said disc to rotate and release the rod holding the lever from pivoting.

3. A poultry weighing and sorting mechanism for use with a conveyor, comprising a tray for poultry, a pivoted lever for supporting said tray, a bracket for supporting said lever, a means for mounting said bracket on a conveyor thereabove, a spring means adapted to be extended in proportion to the weight placed on said tray, a latch means on said bracket for holding said lever and tray in a level position, a movable means for retaining said latch means in its locked position and stationary means for tripping said movable means to release said latch means to empty said tray at a predetermined place along the conveyor line as determined by the weight on said tray.

4. A poultry weighing and sorting mechanism for use with a conveyor, comprising a tray for poultry, a pivoted lever for supporting said tray, a bracket for supporting said lever, a means for mounting said bracket on a conveyor thereabove, a yieldable means adapted to be extended in proportion to the weight placed on said tray, a latch means on said bracket for holding said lever and tray in a level position, a movable means for retaining said latch means in its locked position, and a plurality of stationary means for tripping said movable means to release said latch means to empty said tray at predetermined places along the conveyor line as determined by the weight on said tray.

5. A poultry weighing and sorting mechanism for use with a conveyor, comprising a means for receiving poultry, a pivoted lever for supporting said means, a bracket for supporting said means, a means for mounting said bracket on a conveyor thereabove, a resilient means adapted to be extended in proportion to the weight placed on said first means, a latch means on said bracket for holding said first means in receiving position, a means for retaining said latch means in its locked position, and a plurality of stationary means spaced along the conveyor for tripping said movable means to release said latch means to empty said poultry receiving means at predetermined places along the conveyor line as determined by the weight on said receiving means.

References Cited in the file of this patent
UNITED STATES PATENTS

| | | |
|---|---|---|
| 1,246,463 | Price | Nov. 13, 1917 |
| 1,731,095 | Draeger | Oct. 8, 1929 |
| 1,814,026 | Draeger | July 14, 1931 |
| 2,435,706 | Barker | Feb. 10, 1948 |
| 2,471,711 | Altenpohl | May 31, 1949 |